United States Patent [19]  [11] 4,081,507
Dunn, Jr.  [45] Mar. 28, 1978

[54] PROCESS FOR REMOVING CHEMISORBED AND INTERSTITIAL CHLORINE AND CHLORIDES FROM A HOT TITANIUM DIOXIDE BENEFICIATE-CARBON MIXTURE

[75] Inventor: Wendell E. Dunn, Jr., North Sydney, Australia

[73] Assignee: Titanium Technology N.V., Curacao, Netherlands Antilles

[21] Appl. No.: 619,204

[22] Filed: Oct. 3, 1975

Related U.S. Application Data

[63] Continuation-in-part of Ser. No. 349,255, Apr. 9, 1973, Pat. No. 3,960,203, which is a continuation-in-part of Ser. No. 138,461, Apr. 29, 1971, abandoned.

[51] Int. Cl.$^2$ .............. C01G 23/04; C01B 31/02; F28D 13/00
[52] U.S. Cl. .......................................... 423/74; 423/69; 423/610; 165/1; 423/DIG. 16
[58] Field of Search ............... 423/69, 610, 74, 613; 165/1

[56] References Cited

U.S. PATENT DOCUMENTS

| | | | |
|---|---|---|---|
| 1,967,235 | 7/1934 | Ferkel | 423/613 X |
| 2,657,976 | 11/1953 | Rowe et al. | 423/74 |
| 2,852,362 | 9/1958 | Daubenspeck et al. | 423/74 |
| 2,990,249 | 6/1961 | Wagner | 423/613 X |
| 3,803,287 | 4/1974 | Fukushima | 423/74 |
| 3,950,489 | 4/1976 | Fukushima | 423/74 |
| 3,960,203 | 6/1976 | Dunn, Jr. | 165/1 |

FOREIGN PATENT DOCUMENTS

1,284,183  8/1972  United Kingdom ............... 423/610

*Primary Examiner*—Edward Stern

[57] ABSTRACT

This invention relates to a process for removing hydrogen chloride, chlorine, chlorides, oxychlorides and metal chlorides from a beneficiate produced by contacting a titaniferous ore with chlorine at high temperatures preferably in the presence of carbon wherein the beneficiate mixed with carbon is contacted at temperatures of about 1000° C. with steam, moist air or moist inert gas. The beneficiate which is essentially titanium dioxide is useful as a starting material for the manufacture of titanium dioxide pigments.

3 Claims, No Drawings

PROCESS FOR REMOVING CHEMISORBED AND INTERSTITIAL CHLORINE AND CHLORIDES FROM A HOT TITANIUM DIOXIDE BENEFICIATE-CARBON MIXTURE

REFERENCE TO PRIOR APPLICATIONS

This application is a continuation-in-part of my copending application Ser. No. 349,255 filed Apr. 9, 1973 now U.S. Pat. No. 3,960,203, issued June 1, 1976 which was a continuation-in-part of my application Ser. No. 138,461 filed Apr. 29, 1971, now abandoned.

FIELD OF THE INVENTION

This invention relates to beneficiation of titaniferous ores by high temperature chlorination and more particularly this invention is directed to increasing the inertness of the beneficiate by removal of corrosive and pollutant chlorides therefrom.

SUMMARY OF THE PRIOR ART

It is well known that titaniferous ores, particularly ilmenite, can be beneficiated by high temperature reactions with chlorine with or without reducing agents. The solid product is high grade $TiO_2$, a relatively inert solid, which can be reacted again at high temperatures, with chlorine and a reducing agent to form $TiCl_4$ which is useful in making titanium dioxide pigments and titanium metal.

The beneficiate, product of the chlorination of the titaniferous ore, upon emerging from the high temperature reactor, contains chlorine and chlorides such as metal chlorides and hydrogen chloride as interstitial corrosive gases. In addition the $TiO_2$ surface has bound to it a significant quantity of chlorides, probably as an oxychloride. These chlorides will condense upon cooling, hydrate and causing fuming and corrosive conditions deleterious to the environment particularly transport containers.

Recently Fukushima in U.S. Pat. No. 3,803,287, described a process to remove residual chlorides by acidified aqueous leaching. However, this requires in addition to a leaching step, a drying step and creates the additional problem of the disposal of the leach liquor. I have found a simpler method of treating overflow product from the beneficiator which is the reactor used to beneficiate the ore, to remove the chlorine and chlorides from the product and yet which does not add additional steps such as an additional drying step to the beneficiate processing.

SUMMARY OF THE INVENTION

This invention is directed to a process for removing chlorine and chlorides from a beneficiate produced by reacting a titaniferous ore with chlorine at temperatures of about 1000° C. under reducing conditions, said beneficiates ore comprising essentially pure titanium dioxide and chlorine, chemisorbs chlorine and metal chlorides or said beneficiate mixed with 5 to 35%, by weight, of particulate carbon, which comprises contacting the beneficiate or the beneficiate-carbon mixture with steam, moist air or moist inert gas and removing the chlorine and chlorides liberated thereby and at the same time thereby cooling the beneficiate. Carbon in the mixture can be separated from the product to yield synthetic rutile or the ore-carbon mixture can be used to produce titanium tetrachloride.

DESCRIPTION OF THE PREFERRED EMBODIMENTS

My invention consists of contacting the above described chloride-containing beneficiate as hot bed overflow from a reactor in which it was produced which can contain carbon, at temperatures over 1000° C., with steam, moist air or an inert gas containing water vapor without forming an explosive mixture and yet reacting trace chlorine and chlorides in the product and decreasing the trace chlorine and chloride by at least an order of magnitude or better.

In the preferred embodiment, the invention is practiced with a fluidized bed to cool the incoming beneficiator bed overflow by vigorous mixing with solids at the final temperature, the cooler bed temperature. The water vapor in the fluidizing gas enters with the fluidizing gas through a multipoint distributor and contacts the hot particles. The chlorides both condensed and chemisorbed and the interstitial gases are swept out of the fluidized bed in the off-going gases.

The carrier gas may be air, an inert gas, a combustion gas which can contain a hydrocarbon, provided water vapor is present. The cooler temperature should be at least 150° C. and the water vapor content not less than 5 mmHg vapor pressure. There is no upper limit to the amount of water which can be used, pure steam can be used even if introduced as liquid water as described in my copending U.S. patent application Ser. No. 349,255.

Chloride values attached to the titania surface are hydrolyzed away by the water vapor with HCl and other gases transporting the chlorides from the surfaces to the gas phase.

I have found a method of treating the beneficiator overflow product which will remove the chloride values from the product. In the preferred embodiment the hot (900° to 1080° C.), bed overflow of coke and beneficiate enters a fluidized bed cooler operating at temperatures from 150° – 350° C. The cooler is fluidized with moist air or inert gas or steam.

The chloride attached to the titanium surface is hydrolyzed and enters the gas phase as hydrogen chloride. Similarly, iron chlorides are hydrolyzed to remove chloride values. Manganese chloride, magnesium chloride and calcium chloride are not easily hydrolyzed or oxidized in the final product. However, vaporization from the hot particle to the cold gas phase results in the removal of manganese chloride but neither magnesium nor calcium chloride which have lower vapor pressures are removed. This results from the fact that magnesium chloride has only 1/7th of the vapor pressure of manganese chloride and the vapor calcium chloride is at least an order of magnitude below magnesium chloride.

In order to strip interstitial gases from the porous product a small fluidized bed having ore and carbon five minutes retention time, fluidized at low velocity with air or nitrogen can be used in conjunction and prior to contacting the hot ore or hot ore-carbon mixture with water vapor as described above to decrease $Cl_2$ losses. The volatiles obtained consisting of the volatile iron chlorides and $TiCl_4$, if present, is recycled to the beneficiator system before the solids move into the cooler where they are contacted with steam, moist air or moist inert gas.

EXAMPLE I

A fluidized cooler consisting of a mild steel vessel having a diameter of 4ft. and a height of 10ft. and multipoint gas distributor received the overflow from the benefication reactor fed with 25 lbs coke and 70 lbs ilmenite/minute and contacted with chlorine at 1050° C. The overflow at a temperature of 1050° C. consisting of beneficiated ilmenite which contained about 0.1%, by weight, of chlorine values, analyzed about 98% $TiO_2$, and 0.7% of iron as $Fe_2O_3$ on a coke free basis. The overflow passed from the beneficiator through a cooled 6 inches 316 stainless steel pipe into a 16 inches diameter stainless steel reactor containing fluidized bed (5 minutes solids retention time) fluidized by dry $N_2$ and thence through a similar pipe to the fluidized cooler, entering 6 inches above the distributor.

The solids in the fluidized cooler were contacted with steam or water saturated inert gas or air at a superficial fluidization velocity of 0.5 ft./sec.

A 9 hour continuous run was made starting with a partially full fluidized cooler which was sampled as soon as overflow was established. Table 1 gives the solubles analysis (in weight percent) and the temperature of a series of samples taken 2 hours apart.

TABLE I

| Sample | Temp % | Total Soluble | Soluble Cl | Soluble Fe | Soluble Mn | Soluble Mg |
|---|---|---|---|---|---|---|
| 1 | 100° C | .38 | .103 | .077 | .018 | .003 |
| 2 | 200° C | .17 | .047 | Nil | .010 | .003 |
| 3 | 220° C | .09 | .028 | Nil | .004 | .003 |
| 4 | 185° C | .05 | .010 | Nil | Nil | .003 |

| Sample | mmols Cl | mmols Fe | mmols Mn | mmols Mg | Cl |
|---|---|---|---|---|---|
| 1 | 2.906 | 1.379 | .328 | .123 | −.754 |
| 2 | 1.326 | Nil | .182 | .123 | +.716 |
| 3 | .790 | Nil | .073 | .123 | +.398 |
| 4 | .282 | Nil | Nil | .123 | +.036 |

The extra chloride is probably on the surface of the beneficiate as bound chloride and as calcium chloride.

The decline with increasing sample time shows the gradual purging of the fluidized cooler which had a retention time constant of two hours. The lower temperature of the cooler at Sample 4 shows that the chloride stripping is not a function of temperatures above 185° C.

The negative chloride value of the first sample may be indicative of FeOCl which is stable to 500° C. and hydrolyzes moderately slowly.

In the process of this invention, it is convenient to treat a titainium beneficiate - carbon mixture having a temperature of 900° to 1080° C. produced by reacting, under fluidizing conditions, chlorine with a titaniferous ore, having a particle size of 100 to 200 mesh mixed with 5 to 35%, by weight, of particulate carbon, at a temperature of 900° to 1080° C. and preferably at a temperature of 1000° to 1080° C, comprising contacting, under fluidizing conditions, the beneficiate - carbon mixture with steam, moist air or moist inert gas at a flow rate of at least 0.5 ft/sec., exiting chemisorbed chlorine and chlorides liberated thereby and cooling thereby said beneficiate - carbon mixture to a temperature of 150° to 350° C.

The process can be conducted continuously by conducting the beneficiate - carbon mixture into a reactor containing a fluidized bed of beneficiate - carbon mixture having a temperature of 150° – 350° C., continuously contacting the resulting bed with steam, moist air, or moist inert gas at a flow rate of at least 0.5 ft/sec. and continuously removing the bed at a rate wherein a constant bed depth is maintained.

Instead of steam, moist air, or moist inert gas, the hot beneficiate - carbon mixture or the beneficiate alone can be contacted at a rate where film boiling of the water maintains fluidizing conditions.

The foregoing detailed description has been given for clarity of understanding only and no unnecessary limitations are to be understood therefrom. The invention is not limited to the exact details shown and described for obvious modification will occur to those skilled in the art.

The embodiment of the invention in which an exclusive property or privilege is claimed are defined as follows:

1. A process for removing chemisorbed and interstitial chlorine and chlorides from a titanium dioxide beneficiate - carbon mixture having a temperature of 900° to 1080° C. produced by reacting under fluidizing conditions, chlorine with a titaniferous ore, having a particle size of 100 to 200 mesh, mixed with 5 to 35%, by weight, of particulate carbon, at a temperature of 900° to 1080° C. comprising contacting, under fluidizing conditions, said beneficiate - carbon mixture with steam, moist air or moist inert gas at a flow rate of at least 0.5 ft/sec., exiting chemisorbed and interstitial chlorine and chlorides liberated thereby and cooling said beneficite - carbon mixture to a temperature of 150° to 350° C.

2. The process of claim 1 wherein the temperature of the beneficiate - carbon mixture is initially 1000° to 1080° C.

3. The process of claim 2 comprising contacting the beneficiate - carbon mixture with water at a rate where film boiling of the water maintains fluidizing conditions.

* * * * *